US011182615B2

(12) United States Patent
Lin et al.

(10) Patent No.: US 11,182,615 B2
(45) Date of Patent: Nov. 23, 2021

(54) METHOD AND APPARATUS, AND STORAGE MEDIUM FOR IMAGE DATA PROCESSING ON REAL OBJECT AND VIRTUAL OBJECT

(71) Applicant: TENCENT TECHNOLOGY (SHENZHEN) COMPANY LIMITED, Shenzhen (CN)

(72) Inventors: Jingwei Lin, Shenzhen (CN); Ying Zhu, Shenzhen (CN); Geyu Liao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/780,891

(22) Filed: Feb. 3, 2020

(65) Prior Publication Data

US 2020/0285851 A1    Sep. 10, 2020

Related U.S. Application Data

(63) Continuation of application No. PCT/CN2018/097860, filed on Aug. 1, 2018.

(30) Foreign Application Priority Data

Aug. 4, 2017    (CN) .......................... 201710661746.0

(51) Int. Cl.
*G06K 9/00* (2006.01)
*G06F 16/583* (2019.01)
(Continued)

(52) U.S. Cl.
CPC ..... *G06K 9/00671* (2013.01); *G06F 16/5854* (2019.01); *G06F 16/784* (2019.01);
(Continued)

(58) Field of Classification Search
None
See application file for complete search history.

(56) References Cited

U.S. PATENT DOCUMENTS

2013/0033611 A1    2/2013 Chen
2016/0277419 A1*   9/2016 Allen .................... H04W 4/023
(Continued)

FOREIGN PATENT DOCUMENTS

CN    102332095 A    1/2012
CN    102916986 A    2/2013
(Continued)

OTHER PUBLICATIONS

Taiwan Intellectual Property Office Examination report for Application No. 107126766 dated Nov. 26, 2019 14 pages (including translation).
(Continued)

*Primary Examiner* — Jeffrey J Chow
(74) *Attorney, Agent, or Firm* — Anova Law Group, PLLC

(57) ABSTRACT

An image processing method and apparatus, and a storage medium are provided. The method includes: recognizing a feature of a real object from obtained image data, the image data describing an environment of a local client that includes the real object or an environment of a peer client that includes the real object; querying a server providing services to a social network by using the feature of the real object; determining that the real object has a corresponding attribute in the social network; obtaining an augmented reality (AR) model adaptive to the real object based on the attribute of the object in the social network; rendering a first image according to the obtained image data; and rendering a virtual object
(Continued)

in the AR model according to a position of the real object in the first image, to jointly display the real object and the virtual object.

20 Claims, 11 Drawing Sheets

(51) Int. Cl.
    *G06F 16/783*     (2019.01)
    *G06F 16/9536*     (2019.01)
    *G06Q 30/02*     (2012.01)
    *G06Q 50/00*     (2012.01)

(52) U.S. Cl.
    CPC ..... *G06F 16/9536* (2019.01); *G06K 9/00281* (2013.01); *G06K 9/00362* (2013.01); *G06Q 30/0277* (2013.01); *G06Q 50/01* (2013.01)

(56) References Cited

U.S. PATENT DOCUMENTS

| | | | |
|---|---|---|---|
| 2017/0309051 A1 | 10/2017 | Yamasaki et al. | |
| 2018/0143748 A1* | 5/2018 | Ahmed | H04N 21/4312 |
| 2018/0247111 A1* | 8/2018 | Tomlinson | G06F 21/32 |
| 2019/0130652 A1* | 5/2019 | Yu | G06T 13/40 |
| 2019/0297461 A1* | 9/2019 | Charlton | G06K 9/00691 |
| 2021/0041950 A1* | 2/2021 | von und zu Liechtenstein | G06F 3/04847 |

FOREIGN PATENT DOCUMENTS

| | | | |
|---|---|---|---|
| CN | 102332095 | B | 5/2013 |
| CN | 103679204 | A | 3/2014 |
| CN | 104504423 | A | 4/2015 |
| CN | 104901873 | A | 9/2015 |
| CN | 106200917 | A | 12/2016 |
| CN | 106200918 | A | 12/2016 |
| CN | 106295504 | A | 1/2017 |
| CN | 106846237 | A | 6/2017 |
| CN | 107004290 | A | 8/2017 |
| CN | 108305317 | A | 7/2018 |
| GB | 2544885 | A | 5/2017 |
| JP | 2014532330 | A | 12/2014 |
| JP | 2015095031 | A | 5/2015 |
| KR | 101189043 | B1 | 10/2012 |
| KR | 20130063876 | A | 6/2013 |
| KR | 20150126289 | A | 11/2015 |
| WO | 2013043289 | A1 | 3/2013 |

OTHER PUBLICATIONS

The World Intellectual Property Organization (WIPO) International Search Report for PCT/CN2018/097860 dated Nov. 1, 2018 5 Pages (including translation).
The State Intellectual Property Office of the People's Republic of China (SIPO) Office Action 1 for 201710661746.0 dated May 7, 2019 8 Pages (including translation).
The State Intellectual Property Office of the People's Republic of China (SIPO) Office Action 2 for 201710661746.0 dated Jul. 19, 2019 9 Pages (including translation).
Korean Intellectual Property Office (KIPO) Office Action 1 for 20207004027 dated Jan. 18, 2021 8 Pages (including translation).
The Japan Patent Office (JPO) Notification of Reasons for Refusal for Application No. 2020-505230 and Translation dated Mar. 22, 2021 5 Pages.

\* cited by examiner

FIG. 6

METHOD AND APPARATUS, AND STORAGE MEDIUM FOR IMAGE DATA PROCESSING ON REAL OBJECT AND VIRTUAL OBJECT

CROSS-REFERENCES TO RELATED APPLICATIONS

This application is a continuation application of PCT Patent Application No. PCT/CN2018/097860, filed on Aug. 1, 2018, which claims priority to Chinese Patent Application No. 201710661746.0, entitled "IMAGE PROCESSING METHOD AND APPARATUS, AND STORAGE MEDIUM" and filed with the China National Intellectual Property Administration on Aug. 4, 2017, the entire contents of all of which are incorporated herein by reference.

FIELD OF TECHNOLOGY

This application relates to the field of image technologies, and in particular, to an image processing method and apparatus, and a storage medium.

BACKGROUND OF THE DISCLOSURE

With the rapid development of the Internet, especially the mobile Internet, varied clients based on a social network appear and provide great convenience for online social networking of users. A user may use various smart terminal devices to install clients to access the online social network, and perform offline or online interaction with users in the social network at any time and any place.

Displaying an image of an object in various scenarios of the social network is a basic function of a client, but the current display manner is single. In the existing technology, a manner of a virtual character image or a self-portrait is usually used when displaying an image of the user, which serves as a recognizable and distinctive feature of the user in the social network. However, currently, it is difficult for this manner to adapt to desires of showing personalities of users in the social network, and has become an obstacle of the diversification characteristic of the social network.

Because application scenarios in the social network are increasingly diversified, if solutions of respectively setting display manners for a plurality of application scenarios are provided, on one hand, the efficiency is relatively low since users need to set the display manners for different application scenarios, and it has no realistic significance of implementation; on the other hand, the background processing of the social network is consequently complex, causing a very large overhead.

For the requirement of expanding display manners of objects in the various application scenarios of the social network to adapt to the diversification of the social network, there is no effective solution currently.

SUMMARY

Embodiments of the present disclosure provide an image processing method and apparatus, and a storage medium, which can resolve the foregoing technical problem, to effectively expand display manners of objects in a social network.

To achieve the foregoing objective, the technical solutions of the embodiments of the present disclosure are implemented as follows:

According to an aspect, the embodiments of the present disclosure provide an image processing method, including: recognizing a feature of a real object from obtained image data, the image data describing an environment of a local client that includes the real object or an environment of a peer client that includes the real object; querying a server providing services to a social network by using the feature of the real object; determining that the real object has a corresponding attribute in the social network; obtaining an augmented reality (AR) model adaptive to the real object based on the attribute of the object in the social network; rendering a first image according to the obtained image data; and rendering a virtual object in the AR model according to a position of the real object in the first image, to jointly display the real object and the virtual object.

According to another aspect, the embodiments of the present disclosure provide an image processing apparatus, including: a recognition module, configured to recognize a feature of a real object in an environment from obtained image data; a query module, configured to query a social network by using the feature of the real object, and determine that the real object has an attribute of the social network; a model module, configured to obtain an AR model that is adaptive to the real object and that is in the social network; and a rendering module, configured to perform rendering according to the obtained image data, and render a virtual object in the AR model according to a position of the real object in an image formed by the rendering, to form the real object and the virtual object that are jointly displayed.

According to another aspect, the embodiments of the present disclosure provide a non-transitory storage medium, storing an executable program. The executable program, when executed by a processor, cause the processor to perform: recognizing a feature of a real object from obtained image data, the image data describing an environment of a local client that includes the real object or an environment of a peer client that includes the real object; querying a server providing services to a social network by using the feature of the real object; determining that the real object has a corresponding attribute in the social network; obtaining an augmented reality (AR) model adaptive to the real object based on the attribute of the object in the social network; rendering a first image according to the obtained image data; and rendering a virtual object in the AR model according to a position of the real object in the first image, to jointly display the real object and the virtual object.

According to another aspect, the embodiments of the present disclosure provide an image processing apparatus, including: a memory, configured to store an executable program; and a processor, configured to execute the executable program stored in the memory. The processor is configured to perform: recognizing a feature of a real object from obtained image data, the image data describing an environment of a local client that includes the real object or an environment of a peer client that includes the real object; querying a server providing services to a social network by using the feature of the real object; determining that the real object has a corresponding attribute in the social network; obtaining an augmented reality (AR) model adaptive to the real object based on the attribute of the object in the social network; rendering a first image according to the obtained image data; and rendering a virtual object in the AR model according to a position of the real object in the first image, to jointly display the real object and the virtual object.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

FIG. 6 is a schematic diagram of face feature points according to an embodiment of the present disclosure.

DESCRIPTION OF EMBODIMENTS

Figure 1A:
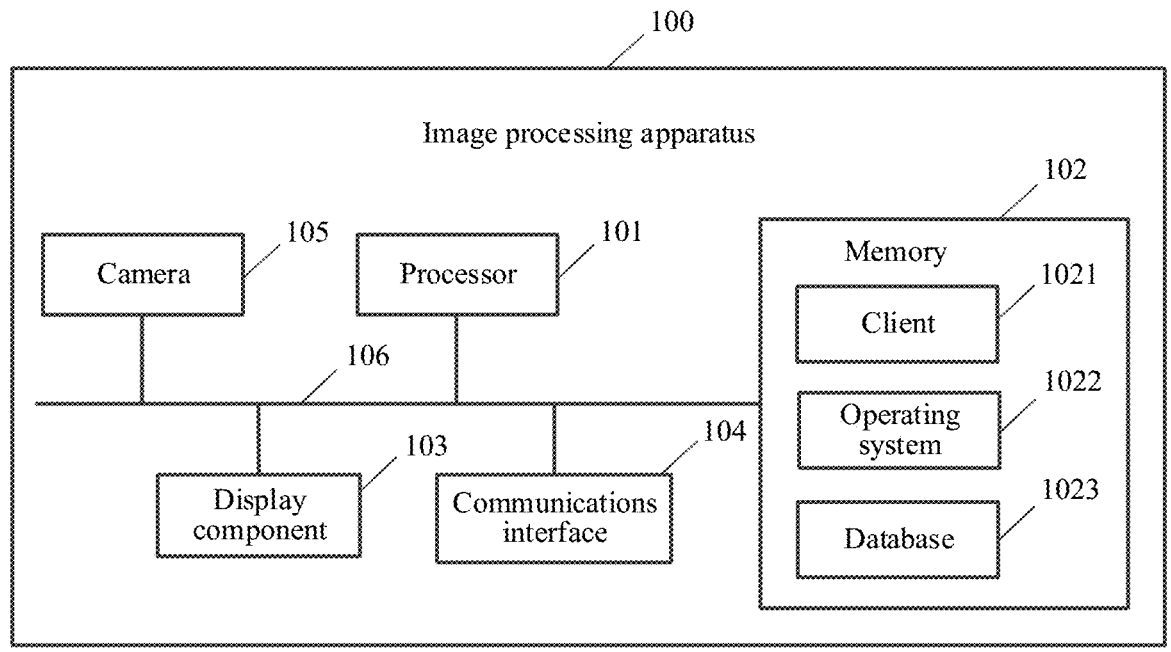
FIG. 1A is a schematic diagram of an optional hardware structure of an image processing apparatus according to an embodiment of the present disclosure.

To make objectives, technical solutions, and advantages of the present disclosure clearer, the present disclosure is further described below in detail with reference to the accompanying drawings. The embodiments to be described are some rather than all of the embodiments of the present disclosure. All other embodiments obtained by persons skilled in the art based on the embodiments of the present disclosure without creative efforts shall fall within the protection scope of the present disclosure.

Before the present disclosure is further described in detail, nouns and terms in the embodiments of the present disclosure are described, and the nouns and the terms involved in the embodiments of the present disclosure are applicable to the explanations described as follows.

1) Augmented reality (AR) is a technology of applying virtual information to a real world, and a real object and a virtual object are superimposed into the same image or space in real time and coexist.

The AR technology can seamlessly integrate information about a real world and information about a virtual world, and simulate and then superimpose, by using a scientific technology, information (vision, sound, taste, and the like) that cannot be experienced in the real world, to apply the virtual information to the real world to be perceived by human senses, thereby achieving sensual experience of combination of virtuality and reality.

For example, a position and a posture of a real object in a real image (namely, only including a picture or a video of a real object in a real world) are computed, a technology of an image including a virtual object, such as a picture, a video, or a three-dimensional (3D) model, is applied to the real image according to the position and the posture of the real object, and an image including a virtual object is added to the real image in a 3D space. For example, a virtual item located based on a face is added according to a position and a posture of the face in a picture or a video of a real object, to implement a face decoration effect. For another example, according to QR code of a scanned product, product information and/or a store and an address where the product may be purchased may be displayed near the displayed QR code.

The AR may further implement a real-time interaction characteristic according to a scenario. For example, in a process of implementing an AR type game, a matched glove or handle of an AR system is used to control actions in the game; or in an AR chess match, a matched glove of an AR system may be used to control pieces.

2) Client is a client installed in a device in this specification, or a third-party client in a device, configured to support various applications based on a social network, and implement a plurality of social functions, such as a video call function or a picture sending function.

3) Device is an electronic device supporting running of the client, such as a smartphone, a tablet computer, or a device based on an image processing apparatus display and a head-mounted display (HMD). The HMD may be a transmission HMD based on the principle of optics or a transmission HMD based on a video synthesis technology. The device in this specification is also referred to as a host device of the client.

4) Social network is a network for supporting a plurality of users to perform mutual communication through a client (such as QQ or enterprise IM) based on a server deployed on a network (such as a wide area network or a local area network).

5) Image data is a representation of the strength and spectrum (color) of light of each point on an image of a real object in an environment, and according to information about the strength and spectrum of the light, image information in a real world is converted into data information, namely, the image data, to facilitate digital processing and analysis.

6) AR model is a digital scenario that is outlined by an image processing apparatus by using a digital graphic technology and that is used for AR, for example, a personalized AR decoration in a social network, which may be a decoration such as a hat, glasses, and a background image.

7) Real object is persons and objects in real life that are included in the image data, where the objects include natural scenes such as rivers and mountains, and cultural scenes such as urban landscapes and building landscapes, or other types of objects.

8) Virtual object: When rendering the image data, the client needs to render a virtual object that does not exist in an environment from which the image data is captured, to implement fusion of the real object and the virtual object, and increase the display effect or enhance the information amount. For example, when the real object is a person, the virtual object may be various items and virtual backgrounds used for decorating character images, or may be a personal business card.

9) Render: a visual image of the real object and the virtual object outputted to a screen by using a render engine in the client. For example, in a process of using a social client to perform social networking, to increase active atmosphere of the social networking, some appropriate rendering is performed on an image or a video including a real object. For example, some virtual objects conforming to the current social scenario are added to an image or a video of a user to form special effects.

Now, an image processing apparatus configured to implement the embodiments of the present disclosure is described with reference to the accompanying drawings. The image processing apparatus may be implemented in various forms, and the hardware structure of the image processing apparatus of the embodiments of the present disclosure is described below.

Referring to FIG. 1A, FIG. 1A is a schematic diagram of an optional hardware structure of an image processing apparatus according to an embodiment of the present disclosure. In actual application, the apparatus may be implemented as the forgoing various devices for running clients, such as a desktop computer, a notebook computer, and a smartphone. The image processing apparatus 100 shown in FIG. 1A includes: at least one processor 101, a memory 102, a display component 103, at least one communications interface 104, and a camera 105. The components in the image processing apparatus 100 are coupled by using a bus system 106. It may be understood that, the bus system 106 is configured to implement connection and communication between the components. In addition to a configuration data bus, the bus system 106 further includes a power bus, a control bus, and a state signal bus. But, for ease of clear description, all types of buses in FIG. 1 are marked as the bus system 106.

The display component 103 may include an image processing apparatus display, a mobile phone display screen, and a tablet computer display screen for displaying.

The communications interface 104 may include an antenna system, Bluetooth, wireless fidelity (WiFi), a near field communications (NFC) module, and/or a data line.

The camera 105 may be a standard camera, a telephoto camera, a wide-angle lens, a zoom camera, a digital light field camera, a digital camera, or the like.

It may be understood that, the memory 102 may be a volatile memory or a non-volatile memory, or may include both a volatile memory and a non-volatile memory.

The memory 102 in one embodiment of the present disclosure is configured to store various types of configuration data to support operations of the image processing apparatus 100. Examples of the configuration data include: a program for being operated in the image processing apparatus 100, such as a client 1021, and further include an operating system 1022 and a database 1023. The program for implementing the method of one embodiment of the present disclosure may be included in the client 1021.

The method disclosed in the embodiments of the present disclosure may be applied to the processor 101, or implemented by the processor 101. The processor 101 may be an integrated circuit chip and has a signal processing capability. In an implementation process, steps in the image processing method may be implemented by using a hardware integrated logical circuit in the processor 101, or by using instructions in a form of software. The processor 101 may be a general-purpose processor, a digital signal processor (DSP), another programmable logic component, a discrete gate or a transistor logic device, a discrete hardware component, or the like. The processor 101 may implement or perform the methods, the steps, and logical block diagrams that are provided in the embodiments of the present disclosure. The general-purpose processor may be a microprocessor or any conventional processor or the like. Steps of the methods provided with reference to the embodiments of the present disclosure may be directly performed and completed by using a hardware decoding processor, or may be performed and completed by using a combination of hardware and a software module in the decoding processor. The software module may be located in a storage medium, and the storage medium is located in the memory 102. The processor 101 reads information in the memory 102, and completes the image processing method provided in one embodiment of the present disclosure with reference to its hardware.

Figure 1B:
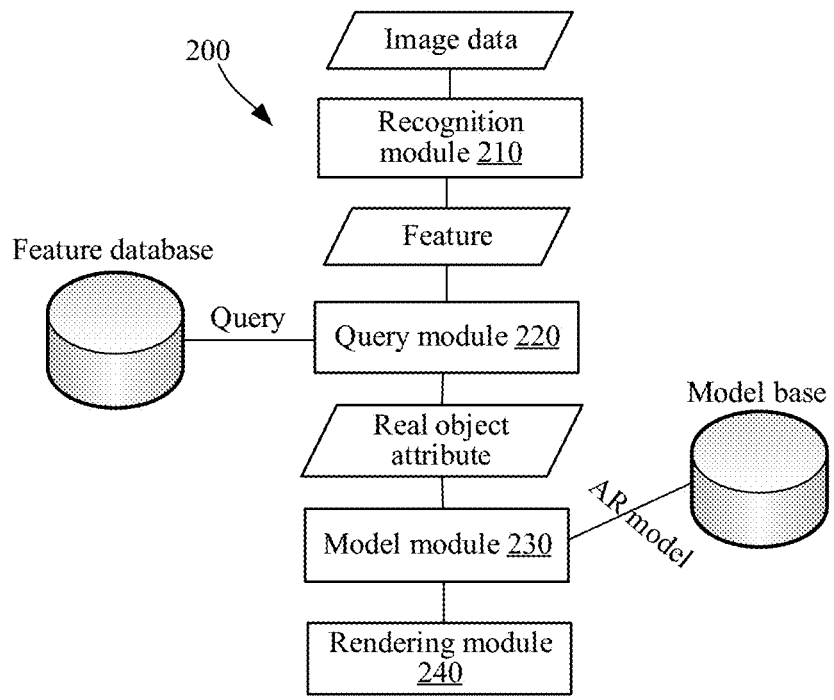
FIG. 1B is a schematic diagram of an optional functional structure of the image processing apparatus according to an embodiment of the present disclosure.

Then, the functional structure of the image processing apparatus shown in FIG. 1A is described. Using software implementation as an example, referring to FIG. 1B, FIG. 1B is a schematic diagram of an optional functional structure of an image processing apparatus for running a local client (it may be understood that, a local client and a peer client are relative concepts) according to an embodiment of the present disclosure. Description is provided with reference to the functional modules shown in FIG. 1B. According to FIG. 1A, the implementation of the functional modules shown in FIG. 1B on hardware may be understood.

A recognition module 210 is configured to recognize a feature of a real object from obtained image data.

In an optional embodiment of the present disclosure, the recognition module 210 receives image data that is formed (i.e., generated) by capturing an environment of a peer client and that is transmitted by the peer client in a social network, and recognizes a feature of a real object located in the environment of the peer client from the received image data; and/or, captures an environment of a local client to form image data, and recognizes a feature of a real object located in the environment of the local client from the captured image data. In other words, the obtained image data describes an environment of a local client that includes the real object or the obtained image data describes an environment of a peer client that includes the real object.

In an optional embodiment of the present disclosure, the recognition module 210 is specifically configured to: capture, when communicating with the peer client in the social network, the environment of the local client to generate the image data to be transmitted to the peer client, and recognize the feature of the real object in the environment of the local client from the captured image data; or capture the environment of the local client to generate the image data in response to a capturing operation of the local client, and recognize the feature of the real object in the environment of the local client from the captured image data.

In an optional embodiment of the present disclosure, the recognition module 210 is specifically configured to: before the AR model that is adaptive to the real object and that is in the social network is obtained, determine that the recognized feature of the real object meets a condition of being recognizable for the social network, where the condition includes at least one of the following: when image feature points are recognized, a quantity of the recognized image feature points exceeds a feature point quantity threshold; and when a biological feature is recognized, a completeness of the recognized biological feature exceeds a completeness threshold.

A query module 220 is configured to query a social network (e.g., query a server providing services to an online social network) by using the feature of the real object, and determine whether the real object has a corresponding attribute in the social network.

The attribute of the social network involved in one embodiment of the present disclosure is for a function carried by the social network, such as a media function (for example, content aggregation), social networking, e-commerce, and payment, and members involved in processes of implementing these functions are concluded in type/function, for example, including:

a registered user attribute, representing that the members are registered users of the social network;

a payment object attribute, representing that the members are accounts for receiving payments;

a shared object attribute, also referred to as a shared item attribute, representing that the members are shared items in the social network, for example, various items such as food and products; and a shared media information attribute, representing that the members are shared media information in the social network, for example, various products without an actual shape, such as a video, audio, and a mobile phone game.

In an optional embodiment of the present disclosure, the query module 220 is specifically configured to: query a feature database of the social network by using the feature of the real object; when the feature of the real object matches a feature of a registered user in the social network, determine that the real object is the registered user belonging to the social network, where the real object has a registered user attribute of the social network; and when the feature of the real object matches a feature of a shared object of the social network, determine that the real object is the shared object of the social network, where the real object has a shared object attribute of the social network.

A model module 230 is configured to obtain an AR model that is adaptive to the real object and that is in a model library of the social network. For example, the AR model adaptive to the real object can be obtained based on the attribute of the object in the social network.

In an optional embodiment of the present disclosure, the model module 230 is specifically configured to: when the real object is a registered user in the social network, obtain a preset virtual object of the registered user in the social network, where the virtual object includes at least one of the following: a virtual item, a virtual background, and a filter; and when the real object is a shared object in the social network, obtain a virtual object for the shared object in the social network, where the virtual object includes at least one of the following: an article for the shared object in the social network; and an advertisement for the shared object in the social network.

In an optional embodiment of the present disclosure, the model module 230 is specifically configured to: invoke a recognition service of a server, and recognize the feature of the real object from the obtained image data; or start an image recognition thread, and recognize the obtained image data in the started image recognition thread, to obtain the feature of the real object.

A rendering module 240 is configured to render a first image according to the obtained image data, and render a virtual object in the AR model according to a position of the real object in the first image, to jointly display the real object and the virtual object.

In an optional embodiment of the present disclosure, the rendering module 240 is specifically configured to: detect a pose change (e.g., position and posture change) of the real object in the image data; and render and output, at the position of the real object in the first image, the virtual object adaptive to the pose change. In some embodiments, the virtual object is superimposed on the real object.

In an optional embodiment of the present disclosure, the query module 220 is specifically configured to query a local buffer or database for an AR model adaptive to the real object; and find an AR model adaptive to the real object from the social network when the query fails.

Figure 2:
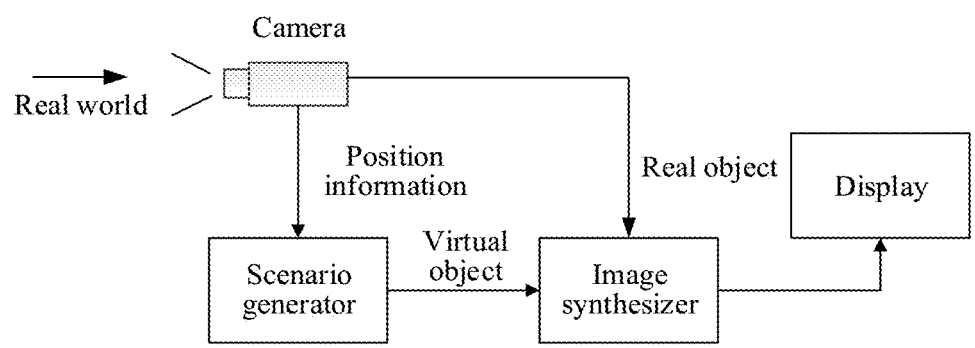
FIG. 2 is a schematic diagram of an optional system structure of the image processing apparatus implemented as an AR device according to an embodiment of the present disclosure.
Figure 3:
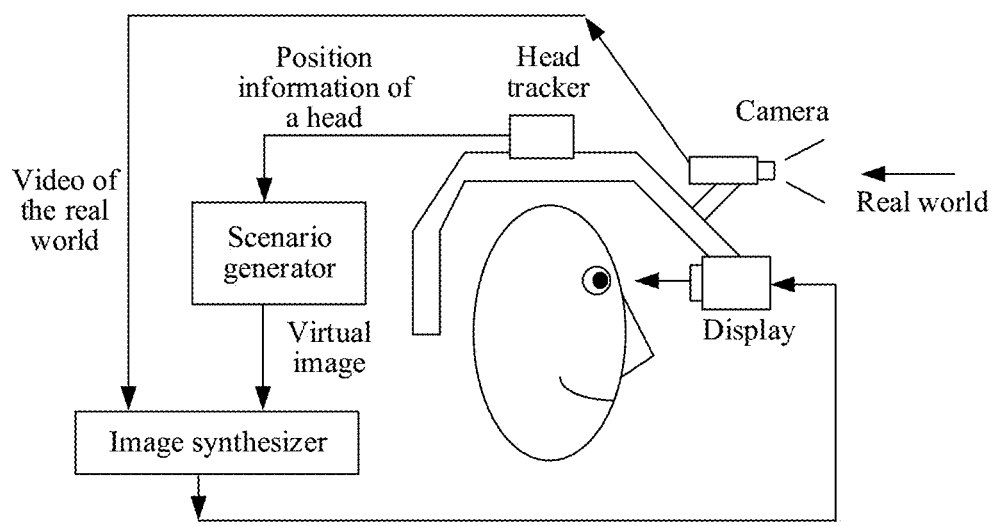
FIG. 3 is a schematic diagram of another optional structure of the image processing apparatus implemented as an AR device according to an embodiment of the present disclosure.

When the image processing apparatus provided in one embodiment of the present disclosure is implemented as AR glasses, the structure of the AR function is implemented for exemplary description. Referring to FIG. 2 and FIG. 3, FIG. 2 is a diagram schematic of an optional structure of an image processing apparatus implemented as an AR device according to an embodiment of the present disclosure, to implement capturing of image data of an environment, and synthesis of the image data and a virtual object for implementing an AR model. FIG. 3 is a schematic diagram of another optional structural of an image processing apparatus implemented as an AR device according to an embodiment of the present disclosure, to implement synthesis output of the image data and the virtual object.

Although the structures of the image processing apparatus are respectively shown in FIG. 2 and FIG. 3, it may be understood that, the structures shown in FIG. 2 and FIG. 3 may be combined for use. To implement a synthesized display effect from capturing image data of an environment to rendering and outputting the image data and the virtual object, components involved in FIG. 2 and FIG. 3 are described.

A camera is configured to obtain image data of an environment including a real object, including an image or a video, and send the obtained image or video to an image synthesizer, to synthesize with a virtual object of an AR model.

A scenario generator is configured to: extract, according to position information of the real object in the image data, for example, position information that is of a head in the image data and that is obtained by a head tracker, a virtual object corresponding to the position information in the AR model, and send the virtual object to the image synthesizer.

The scenario generator is further configured to generate a virtual object according to the position information, and send the virtual object to a display, where the virtual object is used for being superimposed with the real object on the image synthesizer.

The image synthesizer is configured to synthesize the obtained image or video of the real object with the virtual object, and render the synthesized image or synthesized video, where the rendering result is refreshed regularly to the display for display.

The display is configured to display the synthesized image or synthesized video sent by the image synthesizer, to form an effect of jointly displaying the real object and the virtual object of the AR model.

Figure 4:
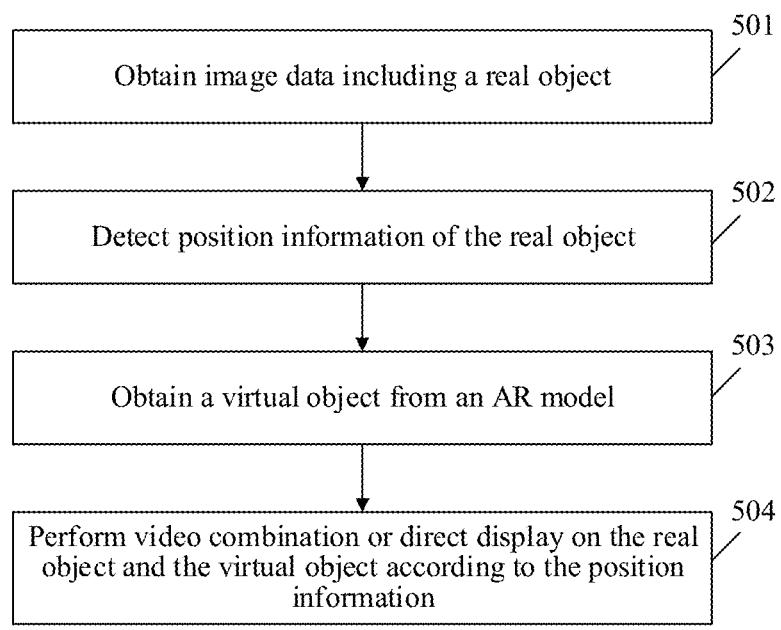
FIG. 4 is a schematic diagram of an optional implementation flow of an image processing method according to an embodiment of the present disclosure.

Now, according to an implementation process of implementing the image processing method of the embodiments of the present disclosure with reference to the description of the accompanying drawings, an example in which the image processing apparatus is implemented as a smartphone or AR glasses according to FIG. 1 to FIG. 3 is used. Referring to FIG. 4, FIG. 4 is a schematic diagram of an optional implementation flow of an image processing method according to an embodiment of the present disclosure. The obtaining of a virtual image of an AR model and image data formed by an environment and including a real object by the image processing apparatus is described, which involves the following steps:

Step 501: Obtain image data including a real object.

Obtaining the image data of the real object is a first step of implementing AR. A user can see a final augmented scenario image only when an image in a real world is inputted to the image processing apparatus, synthesized with a generated virtual image extracted by the image processing apparatus from the AR model, and outputted to the foregoing display component.

The image data of the real object may be captured by the foregoing camera. For example, when a digital light field camera is shooting a real object, such as a person or a natural scene, complete light field information may be obtained, so that the user can implement automatic focusing wherever the eyes want to see in the process of using the image processing apparatus. The obtained light is a light set captured in a real light field, and after the light is synthesized with the virtual image, the user cannot tell true and false through glasses. Certainly, it may also be receiving image data captured and sent by another image processing apparatus.

That is, in a possible implementation, the image processing apparatus captures image data in a real environment through a camera. Because a real object exists in the real environment, the captured image data includes the real object. In another possible implementation, another image processing apparatus captures image data including a real object and then sends the image data to the image processing apparatus of one embodiment, and the image processing apparatus receives the image data.

Step 502: Detect position information of the real object.

To implement perfect combination of a virtual object and a real object such as a person and an item, the virtual object needs to be combined to an accurate position in the real world. Therefore, a position of the real object in the image data is detected in real time, and even a movement direction of the real object is tracked, to help the system decide to display a virtual object in an AR model and a display position of the virtual object, and rebuild a coordinate system according to a field of view of an observer. There may be a plurality of methods for measuring the position information of the real object, for example, a video detection method. A pre-defined mark, an object, or a datum point in a video image is recognized according to a mode recognition technology, then a coordinate transformation matrix is computed according to its shift and rotation angle, and the coordinate transformation matrix is used to represent the position information of the real object; or a rotation angle of the head of the user is measured by a gyroscope, and the position information of the real object is determined, to determine how to transform the coordinates and content of the virtual object in the field of view.

That is, after obtaining the image data, the image processing apparatus detects the position information of the real object in the image data by using any of the foregoing methods for measuring position information. Moreover, in the process of the real object moving in the real environment, the image processing apparatus may obtain a plurality of pieces of image data including the real object, and track a movement track of the real object according to a position and posture change among the pieces of image data, thereby determining the position information of the real object in each piece of image data. The position and posture change of each piece of image data may be detected by a gyroscope, or obtained by tracking two pieces of neighboring image data by using a tracking algorithm.

Step 503: Obtain a virtual object from an AR model.

To obtain immersion of the AR device, the display needs to display realistic images, and perform simulation and display in an AR scenario. Therefore, the image processing apparatus obtains the virtual object from the AR model.

After a locating mark of the real object in the AR scenario is recognized, a coordinate transformation matrix from a pre-defined mark to a mark in the current AR scenario is rebuilt, and the image processing apparatus draws the virtual object in the AR model according to the coordinate transformation matrix, and performs rendering.

Step 504: Perform video combination or direct display on the real object and the virtual object according to the position information.

The image synthesizer of the image processing apparatus first computes affine transformation from virtual object coordinates to a camera visual plane according to position information of the camera and the locating mark of the real object, and then draws the virtual object on the visual plane according to an affine transformation matrix, so that the virtual object and a video or a picture of the real object are combined and then displayed on the display, to form an effect of jointly displaying the real object and the virtual object.

For example, in a scenario of performing a video call by using a client of a social network, the virtual object and a video or an image of the real object are synthesized and displayed on a call interface of the client. For example, virtual objects such as a hat and glasses are superimposed on a face in a video or an image of a caller in real time, which greatly improves the interestingness of video conversation; or in a scenario in which a client of a social network is used to scan the real object offline, a personal business card of a user in the social network is jointly displayed with the image of the real object, which implements seamless access of offline social networking and online social networking.

Figure 5:
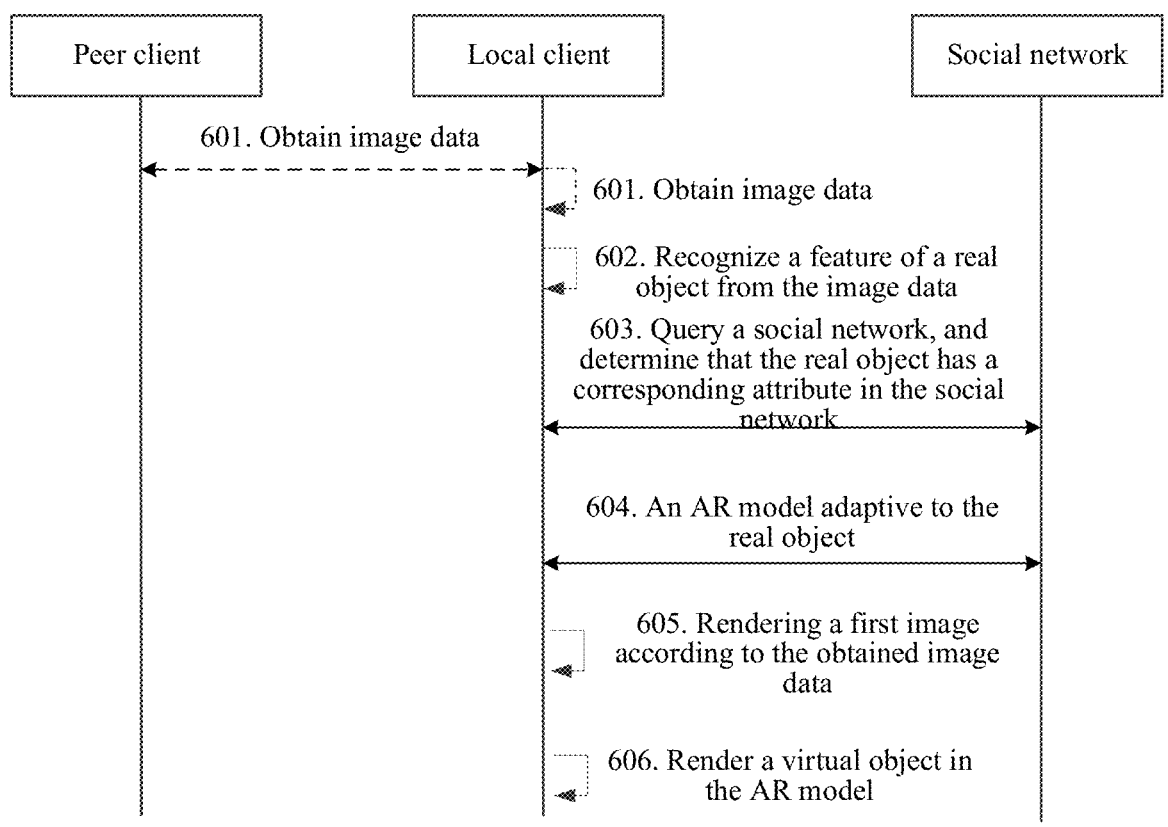
FIG. 5 is a schematic diagram of another optional implementation flow of the image processing method according to an embodiment of the present disclosure.

Based on the described processing process for the image processing apparatus to fuse image data including the real object and the virtual object of the AR model in FIG. 4, a process for a user to use a client of a social network (also referred to as a local client herein because it involves communication with a peer client) to perform image processing in an application scenario of the social network is described below. FIG. 5 is a schematic diagram of another optional implementation flow of the image processing method according to an embodiment of the present disclosure. Description is provided according to the steps shown in FIG. 5.

Step 601: A local client obtains image data.

In an optional embodiment of the present disclosure, the image data may be obtained through shooting by the user invoking the camera through the local client, namely, an environment is captured to form image data in the process of the local client; or the image data may be sent by the peer client in the process of performing video communication by using the local client and the peer client of another user in the social network (the quantity is not limited), namely, in the process of the local client, the image data formed by capturing the environment and transmitted by the peer client in the social network is received, and the feature of the real object in the environment is recognized from the received image data.

Step 602. The local client recognizes a feature of a real object from the obtained image data.

The real object may be a natural scene, a cultural scene, and an object having a life in nature (including human). There is a plurality of feature types of the real object, for example, image features, including: feature points of a face, a contour feature and a texture feature of an object, and the like; and for another example, biological features, including a voiceprint feature, an iris feature, a fingerprint feature, and the like. In one embodiment of the present disclosure, a person is mainly used as an example for description. For example, face feature information of a person is recognized from the image data. The implementation of other types of features may be understood according to the following description.

In an optional embodiment of the present disclosure, the local client invokes a camera of a host device of the local client to shoot to obtain one or more face images including a face of a user, and recognizes face feature points of the shot face image. For example, from the perspective of dimension recognition of a shape feature, different face organs are detected by using an external contour feature, and face feature points of different parts of a face organ are recognized.

In another optional embodiment of the present disclosure, a plurality of frames of face images may also be obtained, and the plurality of frames of shot face images is recognized respectively, to obtain positions of a plurality of face feature points in each face image. For example, the face feature points include any one or more of eye feature points, nose feature points, lip feature points, eyebrow feature points, and face edge feature points.

The plurality of frames of face images may be continuously shot. For example, the face image may be a plurality of frames of continuous face images in a shot video in specified duration. The specified duration is for example, 1 second or 0.5 seconds. Certainly, the face image may also be a plurality of frames of face images distributed discretely in a timeline in a shot video.

Figure 6:
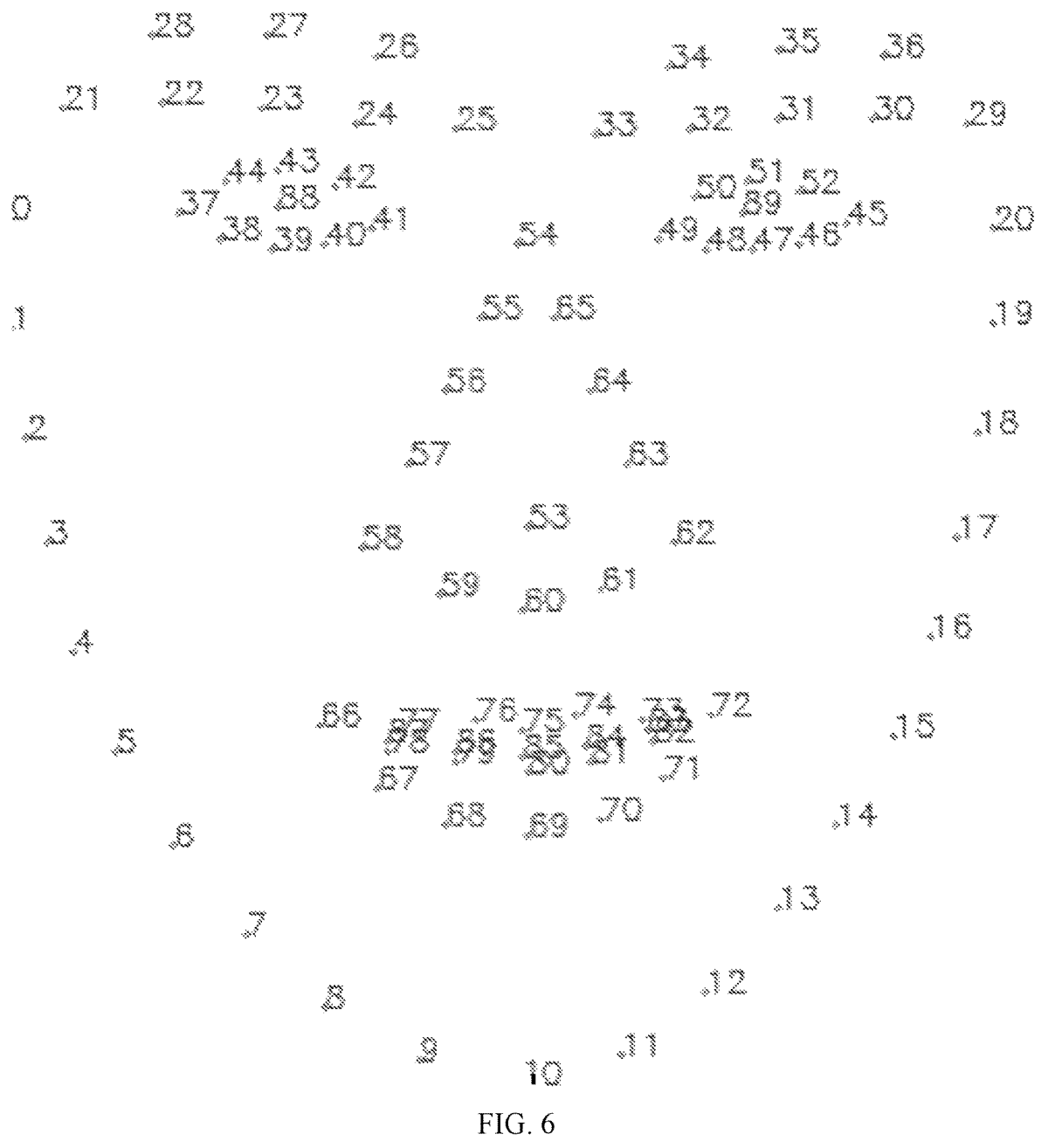

For example, a recognition result of face feature points shown in FIG. 6 may be obtained. For ease of description below, numbers are used to mark the recognized face feature points. For example, 1~20 shown in FIG. 6 represent face edge feature points, 21~28 and 29~36 correspondingly represent left eyebrow feature points and right eyebrow feature points of the user, 37~44 and 88 represent left eye feature points of the user, where 88 is a left pupil feature point, 45~51 and 89 represent right eye feature points of the user, where 89 is a right pupil feature point, 53~65 represent nose feature points of the user, and 66~87 represent lip feature points of the user. The foregoing is merely an example. In an optional embodiment, only some or more feature points may be recognized in the foregoing face feature points, or feature points are marked in other manners, which falls within the scope of the embodiments of the present disclosure.

In one embodiment of the present disclosure, the face feature recognition is used as an example to describe the feature recognition of the foregoing real object. The face feature recognition technology is classified into two types according to the difference of the used criteria, usually according to the difference of the recognized features:

(1) A Method Based on a Local Feature

In an optional embodiment of the present disclosure, in the method based on a local feature, a face may be described by using a local geometric feature of the face, such as relative positions and a relative distance of some face organs (eyes, nose, mouth, and the like). The feature components usually include a Euclidean distance between feature points, a curvature, and an angle, and may implement an efficient description for an obvious face feature.

For example, an integration projection method is used for locating face feature points, and a Euclidean distance between feature points is used as a feature component to recognize a multi-dimensional face feature vector for classification. The feature components mainly include: a vertical distance between an eyebrow and an eye center; a plurality of pieces of description data of an eyebrow radian; a nose breadth and a vertical position of a nose; a nostril position and a face width, and the like. Through the recognition of the foregoing face feature information, a 100% correct recognition rate may be obtained in the recognition process.

In an optional embodiment of the present disclosure, the method based on a local feature may be further an experience description about general characteristics of the face features.

For example, the face image has some obvious basic features. For example, the face region usually includes face features such as two eyes, a nose, and a mouth, and the lightness is generally lower than that of the surrounding region; and the two eyes are roughly symmetrical, and the nose and the mouth are distributed on the axis of symmetry.

In addition to the foregoing integration projection method and priori rule method, the method based on a local feature further includes a method based on geometrical shape information. In this embodiment of the present disclosure, the type of the method based on a local feature is not limited.

(2) A Method Based on a Whole

The method based on a whole is using a face image as a whole to perform transformation processing on the image to recognize features. The method considers the whole attribute of the face, and also remains a topological relationship between face parts and information about the parts.

Because the dimensions of the face image are usually very high, and the distribution of the face image in a high-dimensional space is not very compact, it does not facilitate the classification, and the computing complexity is also very large. A subspace analysis method may be used, to seek for a linear or a non-linear space transformation according to a target, and original high-dimensional data is compressed to a low-dimensional subspace, so that the distribution of the data in the subspace is more compact, which reduces the computing complexity.

In addition, a set of rectangular grid nodes may be placed on the face image, features of each node are described by using a multi-scale wavelet feature at the node, and a connection relationship between the nodes is represented by using a geometrical distance, thereby constructing a face expression based on a two-dimensional topological diagram. In the face recognition process, recognition is performed according to nodes in two images and similarity between connections.

In addition to the foregoing subspace analysis method and elastic graph matching method, the method based on a whole further includes a method based on a neural network, and the like. In this embodiment of the present disclosure, the type of the method based on a whole is not limited.

In an optional embodiment of the present disclosure, according to the difference of execution bodies for recognizing features, the feature recognition for the image data may be classified into the following two manners:

Manner 1: A local client invokes a recognition service of a server, and sends the image data to the recognition service of the server, and the server recognizes the feature of the real object from the obtained image data, and returns the feature to the local client.

The manner 1 is particularly applicable to a situation in which computing resources of the local client are limited, and can effectively reduce computing resources consumed by and the delay caused by the local client performing feature recognition. For example, for the feature recognition in the video, because the object in the video is generally in a movement state, and the feature point recognition of the moving object is complex in the corresponding operation, and occupies a large overhead of the host device of the client. In this case, the recognition service of the server may be invoked, and the recognition service of the server recognizes the feature of the real object from the obtained image data, and returns the feature to the local client.

Manner 2: Start an image recognition thread in the process of the local client, and recognize the obtained image data in the started image recognition thread, to obtain the feature of the real object.

For feature recognition of simple image data, to recognize the feature points more rapidly, the image recognition thread may be started in the process of the host device of the client.

For example, the feature recognition operation is completed by the host device of the client. Because in the recognition process, the user may also listen to music or start a game or video process, to not occupy resources of other applications, the image recognition thread may be started in the process of the client. A quantity of started threads may be decided according to the recognized computing complexity (such as a frame rate of a video or a resolution of a picture). If the computing complexity is relatively low, only a relatively small quantity of threads may be started, and if the computing complexity is recognized to be relatively high, a plurality of threads may be started. After the image recognition thread is started, the obtained image data is recognized in the started image recognition thread to obtain the feature of the real object, thereby ensuring the normal recognition of the feature information of the image data, and also avoiding interrupting the process or thread of other applications.

In an optional embodiment of the present disclosure, for the recognized feature, it may be determined that the recognized feature of the real object meets a condition of being recognizable by the real object, where the condition includes at least one of the following: when image feature points are recognized, a quantity of the recognized image feature points exceeds a feature point quantity threshold; when a biological feature is recognized, a completeness of the recognized biological feature exceeds a completeness threshold; and if the condition is met, perform subsequent steps, or otherwise, return to step 601, until the feature that meets the condition is obtained.

When the user captures the image data of the real object, there may be any of the following situations: 1) being located in a low light environment; 2) the real object is in a movement state; 3) the camera is in a movement state; and 4) the feature of the real object is partially blocked, for example, when the user is shooting the face, most of the face is blocked. When any of the foregoing situations occurs, the obtained feature information is insufficient to complete subsequent operations. Therefore, before the social network is queried by using the feature of the real object, the amount or completeness of the corresponding feature information is determined, so that the computing resource consumption of the social network caused by an incomplete feature query can be avoided.

For example, assuming that the face recognition needs face features such as eyes, nose, and mouth, and the eyes, nose, and mouth all have not less than 100 feature points, when the user is shooting an image, because the light of the shooting is excessively dim, or the user and the camera are in a relative movement state, or most of the face of the user is blocked, for the shot image, except the same feature points and invalid feature points, the eyes, nose, and mouth all have less than 100 feature points. Therefore, this capturing fails, capturing needs to be performed again; otherwise, the next operation may be performed.

Step 603: The local client queries a social network according to the feature of the real object, determines whether the real object belongs to the social network, and if yes, performs step 604; otherwise, returns to step 601.

In an optional embodiment of the present disclosure, according to the feature of the real object, a feature database running in the server of the social network is searched for whether preset feature information matching the feature of the real object is stored, if yes, it is determined that the real object belongs to the social network; and if not, the real object does not belong to the social network.

For example, an example in which the local client is a QQ client is used. The user selects the "QQ-AR" function option, and shoots an image of the user or another user. After the shooting is completed, the QQ client captures feature information of the user face in the picture, and searches the social network according to the feature information for whether feature information of the user exists. If the user pre-uploads the image of the user, the social network has pre-stored preset feature information of the user face, so that preset feature information of the user may be found, and it is determined that the user belongs to the social network; and if the user does not upload the image of the user, it is determined that the user does not belong to the social network.

The various real objects in the social network not only may include registered users of the social network, but also may include shared objects in the social network, for example, various items such as products. The social network is queried by using a corresponding feature recorded in the feature database. For example, the feature database of the social network is queried by using a face feature of a registered user, a texture feature of a shared object, and an image verification. Therefore, there are the following two scenarios according to query results.

Scenario 1: The Type of the Found Object is a Registered User of the Social Network In an optional embodiment of the present disclosure, the feature database of the social network is queried by using the feature of the real object; and when the real object matches the feature of the registered user of the social network, the real object is determined as the registered user belonging to the social network.

For example, when the user of the local client shoots an image of the user or another user, the local client obtains image data of a person, and the feature database in the network is queried according to the feature in the image data. When the feature data pre-stores the image of the user in the image data, it may be determined that the user is a registered user belonging to the social network, and the ID of the registered user in the social network is obtained.

The feature database pre-stores the image feature of the registered user, instead of storing an image feature of an unregistered user. Therefore, whether the user is a registered user in the social network may be determined according to whether the feature database stores the feature of the user in the image data.

Scenario 2: The Type of the Found Object is a Shared Object in the Social Network In an optional embodiment of the present disclosure, the feature database of the social network is queried by using the feature of the real object; and when the real object matches the feature of the shared object of the social network, the real object is determined as the shared object of the social network.

For example, the user shoots a real object such as a product or a scene, the client obtains image data of the real object, obtains feature information of the real object, for example, a feature such as product QR code or a scene contour, and then queries the feature database in the network according to the obtained feature. When the feature database pre-stores an image of a shared object matching the real object, it may be determined that the real object is a shared object of the social network, and the ID of the shared object in the social network is obtained. The shared related content in the social network supports being obtained through a query based on the ID.

When the queried object type is a shared object, a common application is: when the user sees a product shared by a user in the social network, but does not know where to purchase, the user only needs to scan its QR code or barcode. After the scanning is completed, stores where the product may be purchased and address information of the stores may be jointly displayed on a screen or an HMD of the image processing apparatus in an AR manner. The address information may be an actual address, or may be a website, a network address of an e-commerce, for purchasing.

Step 604: The local client obtains an AR model adaptive to the real object from the social network.

In an optional embodiment of the present disclosure, when the real object is a registered user in the social network, a virtual object of the registered user in a preset AR model in the social network is obtained. The virtual object may be used for implementing a decoration effect, for example, including at least one of the following: a virtual item, a virtual background, and a filter. The foregoing filter may be an inner filter, a built-in filter, or a plug-in filter. Certainly, the virtual object may also implement an information display effect, such as displaying a business card of the user in the social network and a shared information index.

For example, in the server of the social network, the face feature of the user is recognized and matched to find an image matching the face feature of the user in the social network, the corresponding ID in the social network is obtained by using the matched image, and an associated AR model used as an adaptive AR model is found according to the ID. It may be understood that, the AR model of the registered user of the social network may involve a personal business card that is randomly allocated by the network and that is at least used for displaying the registered user, and personalized setting may be implemented according to the user.

In an optional embodiment of the present disclosure, when the real object is a shared object in the social network, a virtual object for the shared object in the social network is obtained. The virtual object includes at least one of the following: an article for the shared object in the social network; and an advertisement for the shared object in the social network.

For example, when the user finds a product that the user likes, or a beautiful scenic spot, but does not know related information of the product or scene, the user may aim at the product or scene through "QQ-AR", and then an animation of scanning the product or scene appears on the screen. After the animation ends, it represents the scanning of the product or scene is successful. Then, associated articles or advertisements, or stores and addresses for purchasing the product are found according to information such as the package, appearance, barcode, or QR code of the product; or associated articles or advertisements are found according to the information such as the feature, appearance, and geographical position of the scene.

In an optional embodiment of the present disclosure, for the obtaining of the AR model, a solution for buffering the AR model in a buffer of the local client is provided. For example, for the user of the local client, the social network computes potential friends and interested users or products, and pushes the corresponding AR model in advance to the local client to buffer, to accelerate the rendering speed of the virtual object, and avoid the delay.

Therefore, according to the priority sorting of the local buffer and the social network for querying the AR model, the following two different query results are involved:

Manner 1: Being Stored in a Buffer or a Database of a Host Device

In an optional embodiment of the present disclosure, before the AR model adaptive to the real object is obtained from the social network, first the buffer of the client or the database of the host device is queried for the AR model adaptive to the real object by using the ID of the real object in the social network. In this way, in a situation in which the local client has stored the corresponding AR model, there is no need to request the social network each time, and the rendering speed of the virtual object in the AR model may be accelerated to reduce the delay to the greatest extent.

For example, after the user aims at the user to shoot an image or a video through "QQ-AR", face feature parameters of the user are obtained, and the client queries the buffer according to the feature parameters for whether the previously used AR model is buffered, for example, a personalized AR decoration has been set, and if yes, the AR model is obtained from the buffer, thereby improving the efficiency for obtaining the AR model.

Manner 2: Being Stored in a Server of the Social Network

When the AR model of the real object is not found in the buffer and the database of the host device of the local client, the server of the social network is queried for the AR model storing the real object by using the ID of the real object.

Step 605: The local client performs rendering according to the obtained image data, e.g., renders a first image according to the obtained image data.

Step 606: The local client renders a virtual object in the AR model according to a position of the real object in an image formed by the rendering, to form the real object and the virtual object that are jointly displayed.

According to different display manners, there may be the following two situations:

Manner 1: A device such as a smartphone and a computer.

In an instant messaging scenario of the social network, when a client installed in a device such as a smartphone and a computer obtains an AR model, the AR model is synthesized with a real object carried in image data transmitted in an instant messaging process, and is displayed on the smartphone screen or the computer screen in a manner of the synthesized video or image.

Manner 2: VR Glasses Set with an HMD

Based on a display manner of a transmission HMD of a video synthesis technology, the VR glasses obtain a video or an image in a real world through a camera, then synthesizes a generated or obtained virtual object with the video or image in the real world, performs corresponding rendering, and then displays the video or image in a display through the HMD.

During the rendering, a position relationship between the virtual object of the AR model and the real object needs to be considered, and is described by using the following examples.

Figure 7:
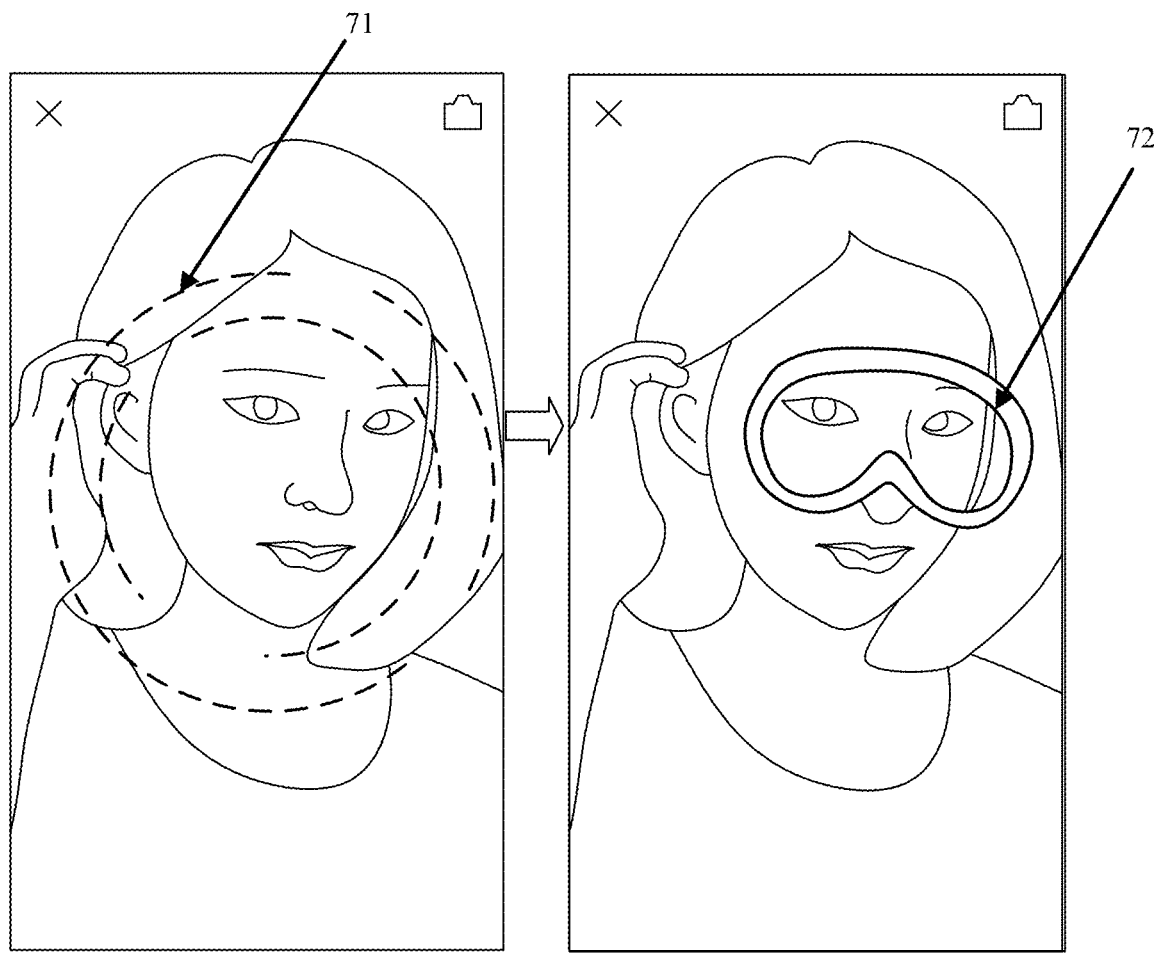
FIG. 7 is a schematic diagram of an effect of jointly displaying a real object and a virtual object according to an embodiment of the present disclosure.

1) As shown in FIG. 7, the user performs video chatting with other users of the social network through the local client, and receives image data (carrying images of other users) of the peer client. The local client performs face feature recognition 71 on the image data, recognizes that the user is a registered user of the social network, and finds that a preset AR model of the user in the social network is an AR decoration-diving glasses. In a rendering process, according to relative positions of the AR glasses decoration and the user eyes, the diving glasses 72 are rendered in front of the eyes of the user.

Figure 8:
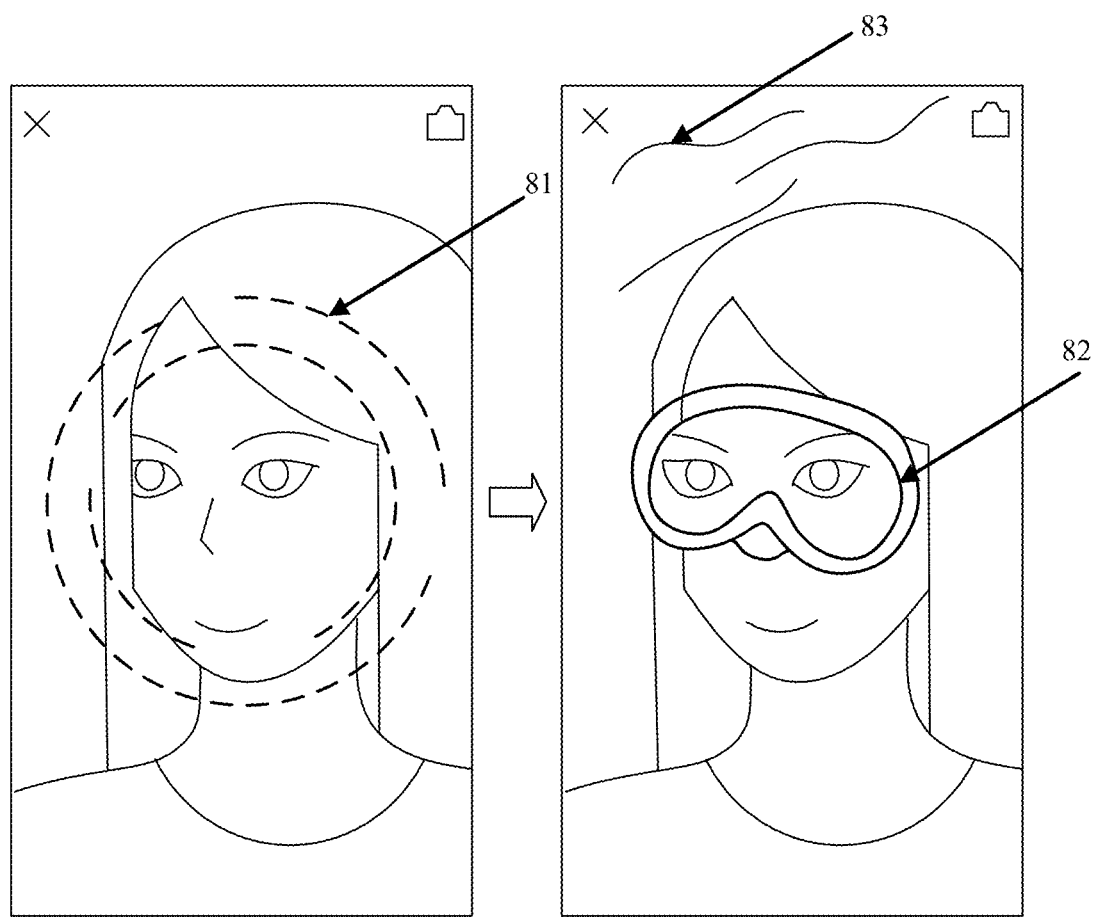
FIG. 8 is a schematic diagram of an effect of jointly displaying a real object and a virtual object according to an embodiment of the present disclosure.

2) As shown in FIG. 8, the local client captures a video from the environment in which the host device is located, including capturing image data for a face in an environment; performs face feature recognition 81 to recognize that the user of the local client is a registered user of the social network; and queries the social network to obtain that the preset AR model is an AR decoration, including a background 83 corresponding water waves and diving glasses 82. According to the relative positions of the diving glasses 82, the virtual background 83, and the user eyes, and a hierarchical relationship of the background 83 and the user, the virtual background 83 is placed at the bottom layer of the user, to prevent the background 83 from blocking the user.

Figure 9:
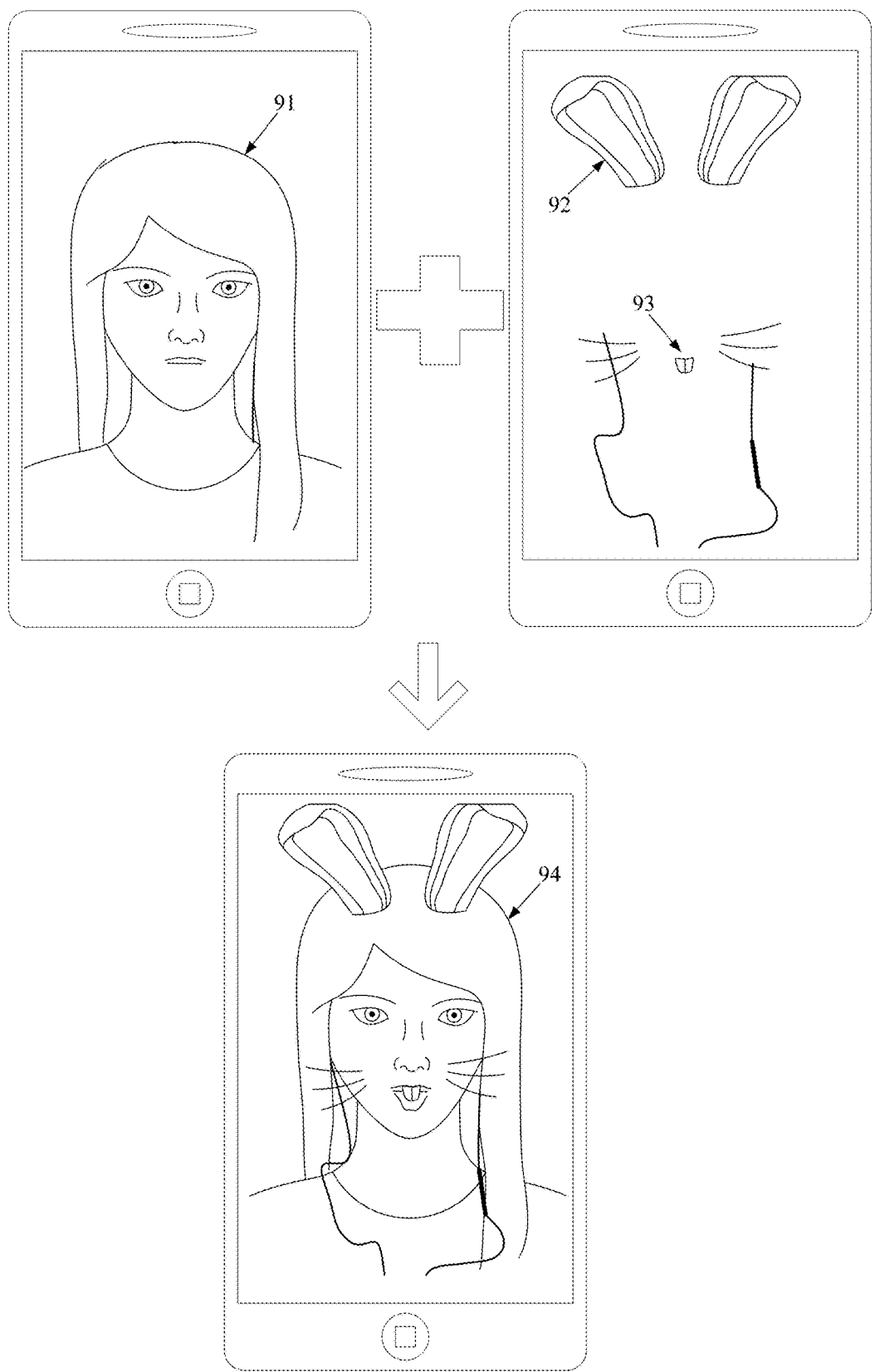
FIG. 9 is a schematic diagram of an effect of jointly displaying a real object and a virtual object according to an embodiment of the present disclosure.

3) As shown in FIG. 9, the user uses a scanning function of the local client to invoke the camera of the host device to scan a face of a new friend, namely, capture image data of the face in the environment, performs face feature recognition 91 to recognize that the new friend is a registered user in the social network, finds that the preset AR model is an AR decoration, and according to the AR decoration, renders personalized decorations of rabbit ears 92 and an open mouth action 93 according to the face position in an interface of displaying the face in the local client. After the synthesis, an image of a head with rabbit ears and an open mouth appears on the user.

In another optional embodiment of the present disclosure, in a situation in which the image data is video data or a series of pictures, the local client detects a position and posture change of the real object in the image data. The position and posture change may be a relative position change or an angle change between the user and the client device. The angle change may be a change of a side view angle, a top view angle, or a bottom view angle between the user and the client. The virtual object that is in the AR model and that is adaptive to the position and posture change is rendered and outputted according to a position of the real object in an outputted image, and the superimposed real object and virtual object are formed, to ensure a seamless fusion effect of the real object and the virtual object.

The local client detects, according to the scanned image data, that the position of the user moves. The local client uses an AR software development kit (SDK) of the device such as an HDM or a mobile phone, to perform tracking and matching on the rendered real object. Namely, with the movement highlighted by the real object or the change of the distance between the local client and the real object and the change of the object angle, corresponding rendering and change are also performed on a widget and a background corresponding to the AR model, thereby forming a better AR effect.

Figure 10A:
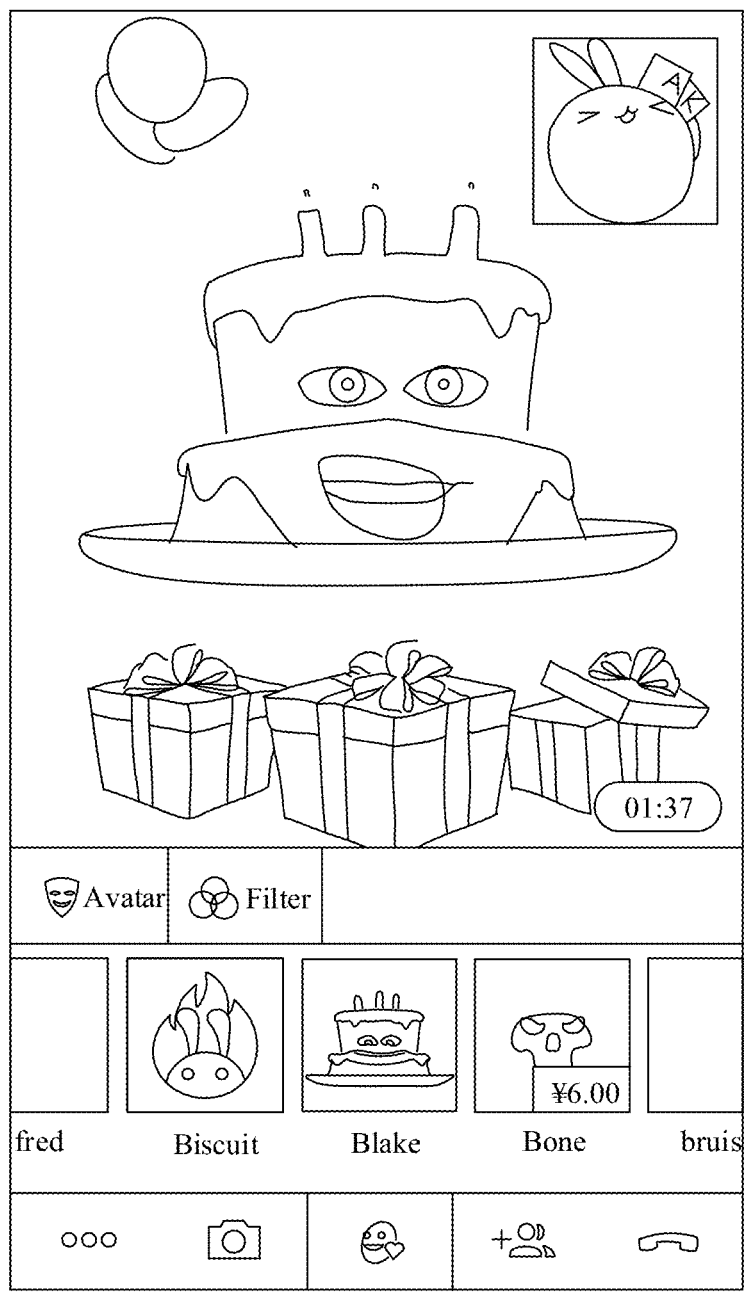
FIG. 10A and FIG. 10B are schematic diagrams of effects of cartoon character decorations and custom network virtual characters according to an embodiment of the present disclosure.
Figure 10B:
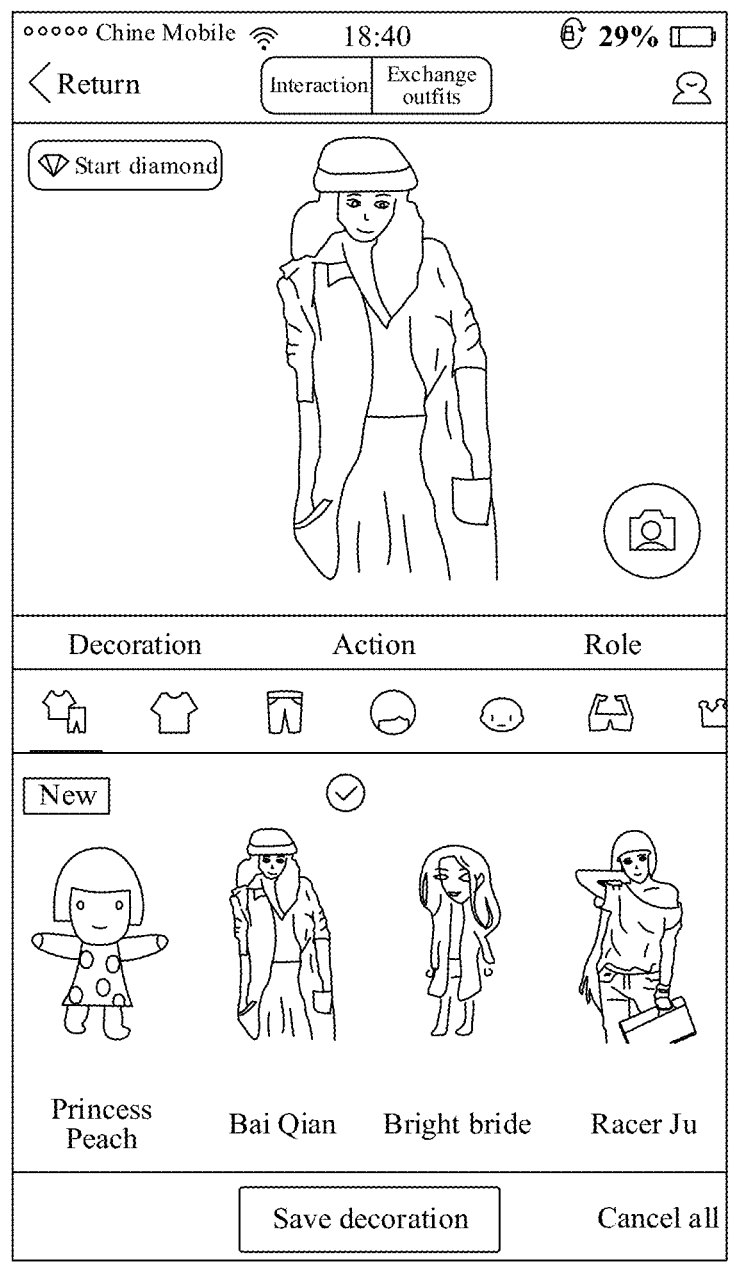

Currently, many IM clients support setting a network virtual character (Avatar) for itself, which is represented in chatting. As shown in FIG. 10A and FIG. 10B, the user is allowed to select a 3D Avatar image that the user likes and apply the image to video chatting. When the head moves or the mouth is open, the Avatar selected by the user also accordingly performs a corresponding action. In addition, there is another cartoon image decoration, for example, the user selects a cartoon image to represent the user in the virtual world, and the user may change outfits and faces for the cartoon image. With today's new endless technologies, the foregoing scenarios cannot well meet user demands. On one hand, the cartoon character and the user have no relations. For young users, rather than adding a cartoon character image to the user, making friends directly see the effect of a cartoon character played by the user can better show personalization.

Figure 11:
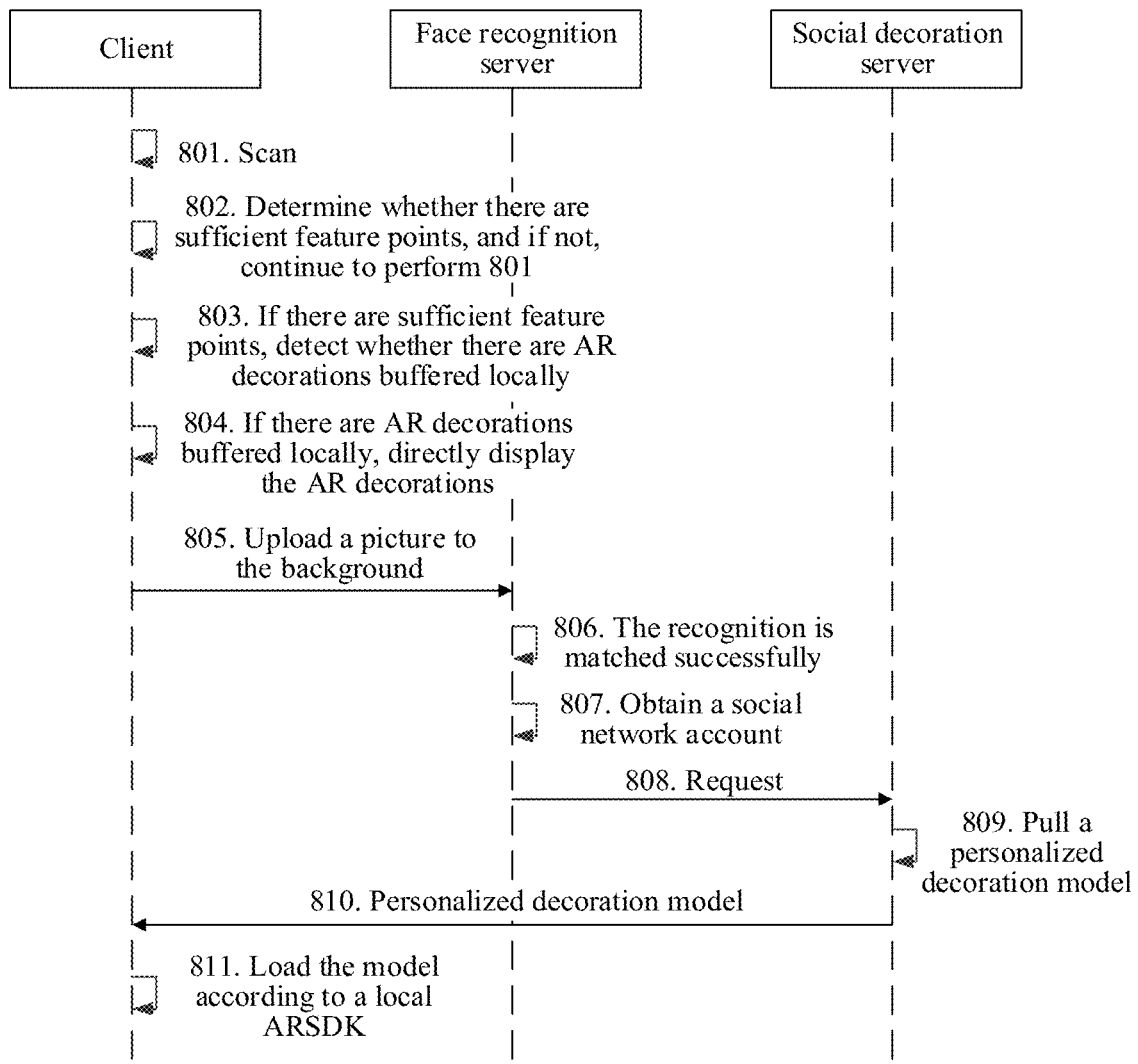
FIG. 11 is a schematic diagram of still another optional implementation flow of the image processing method according to an embodiment of the present disclosure.

The solution of the image processing method provided in the embodiments of the present disclosure may be used for resolving the foregoing problem. Referring to FIG. 11, FIG. 11 is a schematic diagram of still another optional implementation flow of the image processing method according to an embodiment of the present disclosure. A face recognition server and a social decoration server are disposed in the social network. The method includes the following steps:

Step 801: A client performs a capturing operation.

The client may obtain an image including a face, and perform a feature capturing operation on the image, thereby obtaining feature points included in the image.

For example, a mobile QQ client may be used to invoke a scanning function, for example, tap "+" to select "Scan", then select "QQ-AR" to aim at a face (the user or another person), and then perform scanning. For ease of description, herein, the scanned user is referred to as user C.

Step 802: The client determines whether there are sufficient feature points, and if yes, performs step 803; otherwise, continues to perform step 801.

After the capturing operation, a quantity of captured feature points is obtained, and whether the quantity of feature points exceeds a feature point quantity threshold is determined. If yes, it represents that the quantity of feature points is sufficient, and the scanning of the face is successful, and if not, it represents that the quantity of feature points is insufficient, and the capturing needs to be continued.

Whether there are sufficient feature points may be determined by observing an animation of scanning the front face on the screen. Generally, after the animation ends, it represents that the scanning of the face is successful; if not successful, after the scanning stops for 1 second, step 802 continues to be performed.

Step 803: The client detects whether there are AR decorations buffered locally, if yes, performs step 804; and if not, performs step 805.

For the user using the AR decoration for the first time, the client has no corresponding AR decoration buffered locally. In addition, when face information of another person is shot, generally, there is no corresponding AR decoration buffered locally. Certainly, in actual application, the QQ client may receive AR decorations of other users (such as potential friends and interested users) pushed by the background server. Therefore, once the user knows a potential user in an offline social networking process, and uses the QQ client to scan the user, the AR decoration is instantly obtained, and no query needs to be performed at the background server, thereby reducing the delay to the greatest extent.

Step 804: The client displays an AR picture or video.

The AR picture or video is: a synthesized picture of the AR decoration and the image shot by the user, and a synthesized video of the AR decoration and the video shot by the user. After the client obtains the AR decoration, the AR decoration and the image or video shot by the user are synthesized, to obtain an AR picture or video, and an effect of adding the decoration to the user is implemented in the AR picture or video.

Step 805: The client uploads a picture to a face recognition server.

When no corresponding AR decoration is found in the local library, face recognition needs to be performed in the face recognition server, to perform a matching operation on the image stored in the face recognition server according to a recognition result.

Step 806: The face recognition server recognizes that the matching is successful.

If the face recognition server has a matched image, it represents that the matching is successful, and it indicates that the face recognition server stores an image of user C, and user C is a registered user of the social network.

Enter step 806, and there are two scenes: scene 1: user C is the user using the client, and never sets the AR decoration; and scene 2: user C is another person.

Step 807: The face recognition server obtains a social network account.

The social network account may be a QQ number, or may be a WeChat number, or another IM account.

The social decoration server stores a personalized decoration corresponding to each social network account, and after recognizing the registered user, the face recognition server obtains a social network account of the registered user. The obtained social network account is used in the social decoration server to pull the personalized decoration by using the social network account.

Step 808: The face recognition server sends a request of pulling a personalized decoration model to the social decoration server. The request carries the obtained social network account.

Step 809: The social decoration server pulls the personalized decoration model.

If it is scene 1: user C is the user using the client, and never sets an AR decoration.

The face recognition server obtains a personalized decoration model from the social decoration server, and then recommends a corresponding personalized decoration model to the client by using the social decoration server.

If it is scene 2: user C is another person

If user C has set the AR decoration, the face server obtains an AR decoration set by user C from the social decoration server, and then recommends a corresponding personalized decoration model to the client by using the social decoration server. If user C sets no AR decoration, this operation ends.

Step 810: Send the personalized decoration model to the client.

Step 811: The client loads the model according to a local ARSDK.

When the user moves, the client uses an ARSDK of a device such as an HDM or a mobile phone to perform tracking and matching on the displayed content and shape, so that the personalized decoration is rendered and changes as the user moves, thereby forming a better AR effect.

It is easy to understand that, through the foregoing implementations, for example, the local client is a QQ client, which may be applied to the following several typical scenarios.

Scenario 1: Online Social Networking-Implement an AR Decoration in Instant Video Chatting When the user of the local client uses instant messaging (including QQ, WeChat, and the like) to perform video chatting with a peer user (such as relatives and friends), the user invokes the camera in the local client to shoot a video or an image in real time, thereby obtaining parameters for the video or image of the real object. To highlight the personalization and enliven the chatting atmosphere, before the video or image is shot (which may also be in a process of shooting a video or image), a corresponding virtual object, such as a personalized decoration and a virtual background, is added to the real object. For the user of the peer client, when the user uses the camera to shoot a video or a picture, similar to a local user, the user may decorate the shot video or picture, or directly transmit the shot video or picture to the local user, and the local user performs the foregoing decoration operation.

Certainly, the foregoing AR decoration may be replaced with other information in the social network of the user, such as a personal business card, and an account and an image verification, and the like included in the social network.

Scenario 2: Online Social Networking-Implement an AR Decoration in a Video Transmission Process When the local user uses instant messaging (including QQ, WeChat, and the like) to chat with a peer user (such as relatives and friends), the two users may send a shot video or picture that they think funny and nice to each other. For example, after the local user (or the peer user) shoots an eating picture, an instant messaging client recognizes a feature of the real object in the picture, to match a corresponding decoration according to the recognized feature, and then adds a matched decoration to the picture and sends the picture to the peer user (or the local user).

Scenario 3: Offline Social Networking-A Client Scans Other Users

The user of the local client such as the mobile QQ taps the "Scan" option on the client, and then selects "QQ-AR" to aim at the face of the user to be scanned. Then an animation of scanning a real object appears on the screen. After the animation ends, it represents that the scanning is successful, namely, the feature of the real object in an environment is recognized from the captured image data. The social network is queried for a corresponding ID based on the feature, and a preset AR decoration of the user is pulled to the local client according to the found ID, to instantly form a decoration effect on the scanned face.

Scenario 4: Offline Social Networking-A Client Scans the User

The user of the local client such as the mobile QQ uses the camera to aim at the face of the user through "QQ-AR", and then an animation of scanning the face appears on the screen. After the animation ends, it represents that the scanning of the face is successful. At least one personalized decoration may appear on the lower side of the screen to be selected, and after the user selects a personalized decoration that the user likes, the personalized decoration may be applied to the screen. The personalized decoration may be a virtual item, a virtual background, a filter, and the like, and the virtual item may be a hat, glasses, or another face widget. After the user taps and determines to upload the personalized decoration, the face picture and the personalized AR decoration of the user may be respectively uploaded to the server, and bound with the QQ number of the user.

In conclusion, the embodiments of the present disclosure achieve the following beneficial effects:

1) Based on the manner of recognizing a feature from image data and querying a social network, for image data in any scenario of the social network, a real object belonging to the social network can be rapidly recognized, and an AR effect adaptive to the real object in the social network is fused in the corresponding scenario.

2) The social network has a diversification characteristic for AR models of different real objects, for example, a decoration and a social business card in an AR form according to needs, so that when the rendering of the image data is applied, differentiated display effects of different objects are achieved.

3) The combination of a virtual decoration and a character of the other user provides a new pan-social topic entry point for users, and facilitates seamless access from offline social networking to online social networking.

4) The client recognizes the feature from the image data locally according to situations or by invoking a recognition service of the server, which helps reduce the delay and implement synchronous display of the real object and the virtual object.

5) According to the manner of preferentially querying a host device of the client for the AR model, for the situation in which the client pre-stores the AR model locally, timely display of the virtual object in the client can be implemented, thereby avoiding the problem of unsynchronized display of the real object and the virtual object due to the network.

6) Whether to request an AR model from the social network is determined according to a completeness of recognizing the feature from the image data, thereby avoiding invalid computing at the background of the social network, and effectively reducing computing resources of the social network.

The foregoing descriptions are merely exemplary embodiments of the present disclosure, and are not used for limiting the protection scope of the present disclosure. Any modification, equivalent replacement, and improvement made within the spirit and scope of the present disclosure shall fall within the protection scope of the present disclosure.

What is claimed is:

1. An image processing method, applied to a local client, the method comprising:
    recognizing a feature of a real object from image data, the image data describing an environment of the local client that includes the real object or an environment of a peer client that includes the real object;
    querying a server providing services to a social network by using the feature of the real object;
    determining that the real object corresponds to a social network account of a registered user in the social network;
    obtaining an augmented reality (AR) model adaptive to the real object based on the social network account of the registered user in the social network;
    rendering a virtual object in the AR model according to a position of the real object in the image data, to jointly display the real object and the virtual object.

2. The method according to claim 1, wherein the recognizing a feature of a real object from obtained image data comprises at least one of:
    receiving, from the peer client in the social network, the image data generated by capturing the environment of the peer client, and recognizing the feature of the real object located in the environment of the peer client from the received image data; or
    capturing the environment of the local client to generate the image data, and recognizing the feature of the real object located in the environment of the local client from the captured image data.

3. The method according to claim 2, wherein the recognizing the feature of the real object located in the environment of the local client from the captured image data comprises:
    capturing, when communicating with the peer client in the social network, the environment of the local client to generate the image data to be transmitted to the peer client, and recognizing the feature of the real object in the environment of the local client from the captured image data; or,
    capturing the environment of the local client to generate the image data in response to a capturing operation of the local client, and recognizing the feature of the real object in the environment of the local client from the captured image data.

4. The method according to claim 1, further comprising:
    before obtaining the AR model adaptive to the real object in the social network, determining that the recognized feature of the real object meets a condition of being recognizable in the social network, wherein the condition comprises at least one of:
    when image feature points are recognized, a quantity of the recognized image feature points exceeds a feature point quantity threshold; or
    when a biological feature is recognized, a completeness of the recognized biological feature exceeds a completeness threshold.

5. The method according to claim 1, further comprising:
    querying a feature database of the social network by using the feature of the real object;
    determining, when the feature of the real object matches a feature of the registered user of the social network, that the real object has a registered user attribute in the social network; and
    determining, when the feature of the real object matches a feature of a shared object of the social network, that the real object has a shared object attribute in the social network.

6. The method according to claim 1, wherein the obtaining an AR model adaptive to the real object comprises:
    obtaining, when the real object is the registered user in the social network, a preset virtual object of the registered user in the social network, wherein the virtual object comprises at least one of: a virtual item, a virtual background, or a filter; and
    obtaining, when the real object corresponds to a shared object of the social network, a virtual object for the shared object in the social network, wherein the virtual object comprises at least one: an article for the shared object in the social network; or an advertisement for the shared object in the social network.

7. The method according to claim 1, wherein the recognizing a feature of a real object from obtained image data comprises:
    invoking a recognition service of the server, and recognizing the feature of the real object from the obtained image data; or
    starting an image recognition thread, and recognizing the obtained image data in the started image recognition thread, to obtain the feature of the real object in the environment.

8. The method according to claim 1, wherein the rendering a virtual object in the AR model according to a position of the real object in the first image comprises:
    detecting a pose change of the real object in the image data;

rendering and outputting, at the position of the real object in the first image, the virtual object adaptive to the pose change.

9. The method according to claim 1, wherein the obtaining an AR model adaptive to the real object comprises:
   querying a local client for the AR model adaptive to the real object; and
   finding the AR model adaptive to the real object from the social network if the query at the local client fails.

10. The method according to claim 1, wherein a face recognition server and a social decoration server are disposed in the social network, and the method further comprises:
   uploading the feature of the real object to the face recognition server, wherein the face recognition server is configured to retrieve the social network account of the registered user according to the feature of the real object, wherein the social decoration server is configured to receive from the face recognition server a request of pulling the AR model according to the social network account of the registered user, and wherein the face recognition server is further configured to receive from the social decoration server the AR model; and
   receiving from the face recognition server the AR model.

11. An image processing apparatus, comprising: a memory, configured to store an executable program, and a processor, configured to implement, when executing the executable program stored in the memory, the following operations:
   recognizing a feature of a real object from image data, the image data describing an environment of the local client that includes the real object or an environment of a peer client that includes the real object;
   querying a server providing services to a social network by using the feature of the real object;
   determining that the real object corresponds to a social network account of a registered user in the social network;
   obtaining an augmented reality (AR) model adaptive to the real object based on the social network account of the registered user in the social network; and
   rendering a virtual object in the AR model according to a position of the real object in the image data, to jointly display the real object and the virtual object.

12. The apparatus according to claim 11, wherein the processor is further configured to execute the executable program to implement at least one of:
   receiving, from the peer client in the social network, the image data generated by capturing the environment of the peer client, and recognizing the feature of the real object located in the environment of the peer client from the received image data; or
   capturing the environment of the local client to generate the image data, and recognizing the feature of the real object located in the environment of the local client from the captured image data.

13. The apparatus according to claim 12, wherein the processor is further configured to execute the executable program to implement the following operation:
   capturing, when communicating with the peer client in the social network, the environment of the local client to generate the image data to be transmitted to the peer client, and recognizing the feature of the real object in the environment of the local client from the captured image data; or,
   capturing the environment of the local client to generate the image data in response to a capturing operation of the local client, and recognizing the feature of the real object in the environment of the local client from the captured image data.

14. The apparatus according to claim 11, wherein the processor is further configured to execute the executable program to implement:
   before obtaining the AR model adaptive to the real object in the social network, determining that the recognized feature of the real object meets a condition of being recognizable in the social network, wherein the condition comprises at least one of:
   when image feature points are recognized, a quantity of the recognized image feature points exceeds a feature point quantity threshold; or
   when a biological feature is recognized, a completeness of the recognized biological feature exceeds a completeness threshold.

15. The apparatus according to claim 11, wherein the processor is further configured to execute the executable program to implement:
   querying a feature database of the social network by using the feature of the real object;
   determining, when the feature of the real object matches a feature of the registered user of the social network, that the real object has a registered user attribute in the social network; and
   determining, when the feature of the real object matches a feature of a shared object of the social network, that the real object has a shared object attribute in the social network.

16. The apparatus according to claim 11, wherein the processor is further configured to execute the executable program to implement:
   obtaining, when the real object is the registered user in the social network, a preset virtual object of the registered user in the social network, wherein the virtual object comprises at least one of: a virtual item, a virtual background, or a filter; and
   obtaining, when the real object corresponds to a shared object of the social network, a virtual object for the shared object in the social network, wherein the virtual object comprises at least one: an article for the shared object in the social network; or an advertisement for the shared object in the social network.

17. The apparatus according to claim 11, wherein the processor is further configured to execute the executable program to implement:
   invoking a recognition service of the server, and recognizing the feature of the real object from the obtained image data; or
   starting an image recognition thread, and recognizing the obtained image data in the started image recognition thread, to obtain the feature of the real object in the environment.

18. The apparatus according to claim 11, wherein the processor is further configured to execute the executable program to implement:
   detecting a pose change of the real object in the image data;
   rendering and outputting, at the position of the real object in the first image, the virtual object adaptive to the pose change.

19. The apparatus according to claim 11, wherein the processor is further configured to execute the executable program to implement:
   querying a local client for the AR model adaptive to the real object; and finding the AR model adaptive to the real object from the social network if the query at the local client fails.

20. A non-transitory storage medium, storing an executable program, the executable program, when executed by a processor, causes the processor to perform:
   recognizing a feature of a real object from image data, the image data describing an environment of the local client that includes the real object or an environment of a peer client that includes the real object;
   querying a server providing services to a social network by using the feature of the real object;
   determining that the real object corresponds to a social network account of a registered user in the social network;
   obtaining an augmented reality (AR) model adaptive to the real object based on the social network account of the registered user in the social network;
   rendering a virtual object in the AR model according to a position of the real object in the image data, to jointly display the real object and the virtual object.

* * * * *